United States Patent
Amann et al.

(10) Patent No.: US 10,223,293 B2
(45) Date of Patent: *Mar. 5, 2019

(54) ACCESS OF VIRTUAL MACHINES TO STORAGE AREA NETWORKS

(71) Applicant: International Business Machines Corporation, Armonk, NY (US)

(72) Inventors: Stefan Amann, Boeblingen (DE); Gerhard Banzhaf, Nufringen (DE); Ralph Friedrich, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,014

(22) Filed: Nov. 21, 2017

(65) Prior Publication Data

US 2018/0095901 A1    Apr. 5, 2018

Related U.S. Application Data

(63) Continuation of application No. 14/868,098, filed on Sep. 28, 2015, now Pat. No. 9,910,795, which is a (Continued)

(51) Int. Cl.
*G06F 12/14* (2006.01)
*G06F 3/06* (2006.01)
(Continued)

(52) U.S. Cl.
CPC .......... *G06F 12/1458* (2013.01); *G06F 3/067* (2013.01); *G06F 3/0622* (2013.01);
(Continued)

(58) Field of Classification Search
CPC ..................... H04L 49/357; H04L 67/1097
See application file for complete search history.

(56) References Cited

U.S. PATENT DOCUMENTS 6,988,130 B2    1/2006 Blumenau et al.
7,398,421 B1 *  7/2008 Limaye ............... H04L 69/40
                                                        714/16
(Continued)

FOREIGN PATENT DOCUMENTS

GB    2519314 A    4/2015

OTHER PUBLICATIONS

Jones, M., "Deploying virtual servers in a SAN environment," infostor.com, Sep. 27, 2008 (posted Sep. 26, 2008), 3 pages, http://www.infostor.com/indextarticles/display/2709271016/articles/infostor/storage-management/virtualization/deploying-virtual.html.

(Continued)

*Primary Examiner* — Lashonda T Jacobs
(74) *Attorney, Agent, or Firm* — Stosch Sabo

(57) ABSTRACT

A method for managing access of virtual machines executed by a host computer system to storage area networks, the storage area networks connecting the host computer system with storage systems via switches, where the host computer system includes one or more host ports to connect with a switch each, and where one or more port names are assigned to each virtual machine. The method includes, for each storage area network connected with the host computer system, sending the port names of a virtual machine and a target port name as part of a validate access command to the respective switch; and when receiving the validate access command by the switch, the switch returning success information to the sending host computer system in case all received virtual machine port names have access to a target port assigned to the received target port name, otherwise returning a fail information.

20 Claims, 7 Drawing Sheets

Related U.S. Application Data continuation of application No. 14/819,681, filed on Aug. 6, 2015, now Pat. No. 9,916,263.

(51) Int. Cl.
| | | |
|---|---|---|
| *H04L 29/06* | (2006.01) | |
| *H04L 12/931* | (2013.01) | |
| *G06F 9/455* | (2018.01) | |
| *H04L 29/08* | (2006.01) | |
| *G06F 21/62* | (2013.01) | |

(52) U.S. Cl.
CPC ........ *G06F 3/0665* (2013.01); *G06F 9/45558* (2013.01); *G06F 21/6218* (2013.01); *H04L 49/357* (2013.01); *H04L 49/70* (2013.01); *H04L 63/101* (2013.01); *H04L 67/1097* (2013.01); *G06F 2009/45579* (2013.01); *G06F 2009/45583* (2013.01); *G06F 2009/45595* (2013.01); *G06F 2212/1052* (2013.01)

(56) References Cited

U.S. PATENT DOCUMENTS

| | | | | |
|---|---|---|---|---|
| 7,451,204 | B2 * | 11/2008 | Shiga | G06F 17/302 |
| | | | | 709/223 |
| 7,697,515 | B2 * | 4/2010 | Ofer | G06F 3/0605 |
| | | | | 370/389 |
| 7,752,295 | B2 * | 7/2010 | Terai | H04L 12/4641 |
| | | | | 709/223 |
| 7,933,993 | B1 | 4/2011 | Skinner | |
| 8,028,062 | B1 * | 9/2011 | Wigmore | G06F 3/061 |
| | | | | 709/224 |
| 8,055,736 | B2 | 11/2011 | Eisenhauer et al. | |
| 8,072,987 | B1 * | 12/2011 | Madnani | H04L 49/557 |
| | | | | 370/395.7 |
| 8,099,525 | B2 | 1/2012 | Nicholson et al. | |
| 8,156,561 | B2 * | 4/2012 | Mimatsu | G06F 3/0607 |
| | | | | 370/379 |
| 8,429,446 | B2 | 4/2013 | Hara et al. | |
| 8,775,696 | B2 | 7/2014 | Scales et al. | |
| 8,929,252 | B2 | 1/2015 | Subramanyan et al. | |
| 8,949,656 | B1 | 2/2015 | Ninan et al. | |
| 9,021,264 | B2 | 4/2015 | Nossik et al. | |
| 9,063,895 | B1 * | 6/2015 | Madnani | G06F 11/1466 |
| 9,658,897 | B2 | 5/2017 | Amann et al. | |
| 9,658,898 | B2 * | 5/2017 | Amann | G06F 9/5088 |
| 9,672,070 | B2 | 6/2017 | Amann et al. | |
| 9,703,582 | B1 | 7/2017 | Chigurapati et al. | |
| 2004/0250021 | A1 * | 12/2004 | Honda | G06F 3/0605 |
| | | | | 711/114 |
| 2005/0010688 | A1 * | 1/2005 | Murakami | G06F 13/4081 |
| | | | | 709/245 |
| 2005/0114476 | A1 * | 5/2005 | Chen | H04L 67/1097 |
| | | | | 709/220 |
| 2005/0251620 | A1 * | 11/2005 | Matsunami | G06F 3/0605 |
| | | | | 711/114 |
| 2006/0041595 | A1 * | 2/2006 | Taguchi | G06F 3/0605 |
| 2006/0072459 | A1 | 4/2006 | Knight et al. | |
| 2006/0072580 | A1 * | 4/2006 | Dropps | G06F 3/0605 |
| | | | | 370/395.7 |
| 2007/0297428 | A1 | 12/2007 | Bose et al. | |
| 2009/0276774 | A1 * | 11/2009 | Kinoshita | G06F 21/6218 |
| | | | | 718/1 |
| 2011/0078334 | A1 * | 3/2011 | Arakawa | G06F 3/0607 |
| | | | | 710/3 |
| 2012/0254554 | A1 | 10/2012 | Nakajima | |
| 2015/0106518 | A1 | 4/2015 | Amann et al. | |
| 2015/0339078 | A1 * | 11/2015 | Lam | G06F 3/061 |
| | | | | 710/74 |
| 2015/0347057 | A1 * | 12/2015 | Busick | G06F 3/0659 |
| | | | | 710/74 |
| 2017/0039081 | A1 | 2/2017 | Amann et al. | |
| 2017/0039147 | A1 | 2/2017 | Amann et al. | |
| 2017/0153832 | A1 | 6/2017 | Amann et al. | |

OTHER PUBLICATIONS

"T11 Home Page," Home Page for Technical Committee T11, 2 pages, last modified Aug. 3, 2011, http://www.t11.org/index.html.
List of IBM Patents or Patent Applications Treated as Related, dated Nov. 21, 2017, 2 pages.

* cited by examiner

ACCESS OF VIRTUAL MACHINES TO STORAGE AREA NETWORKS

CROSS-REFERENCE TO RELATED APPLICATIONS

This application is a continuation application claiming priority under 35 USC 120 to U.S. patent application Ser. No. 14/819,681 filed on Aug. 6, 2015 and U.S. patent application Ser. No. 14/868,098 filed on Sep. 28, 2015 and all the benefits accruing therefrom, the contents of which are herein incorporated by reference.

BACKGROUND

Aspects of the present disclosure relate to data processing systems, and in particular, to a method, system and computer program product for managing access of virtual machines executed by a host computer system to storage area networks.

Many commercial and other enterprises use storage area networks (SANs) for distributing, acquiring, and managing vast quantities of data. A SAN is a network in which one or more host servers access one or more storage units such as hard disks, optical disks, and tape drives. Typically, each host server includes one or more host-bus adapters (HBAs), each with one or more physical ports.

Large SANs tend to employ virtualization on many levels to allow flexible configuration and reconfiguration of hardware resources. Virtual servers or virtual machines can be used so that a single server can emulate several smaller servers, each with its own instance of an operating system. Disk arrays are divided into logical units (LUNs) that can service different host adapter ports (from the same or different physical servers). Multiple virtual HBA ports can be assigned to a physical port and used so that different virtual servers (running on the same server) can have exclusive access to different sets of LUNs using that same physical HBA port.

Operating Systems access fiber channel storage through world-wide unique identifiers (WWPNs) or identifiers (FC_IDs) tied to a plug position on a Fiber Channel (FC) switch. FC networks typically implement Zoning and LUN masking, which restrict access between WWPNs and FC_IDs from any-to-any to a number of administrator-defined sets. When Operating System instances, such as virtual machines, are moved from one server to another server they still need access to their original data, using a set of unchanged IDs (in the WWPN case) or changed IDs (in the Switch Port case).

When virtual servers using storage area network (SAN) attached storage are to be flexibly deployed and moved around on physical servers (nodes) of a server cluster or cloud, using particular port names to access the SANs and storage resources on storage controllers, it generally must be ensured that port names with identical SAN and storage access capabilities are available for use by the virtual servers on any of the nodes on which they are supposed to run, and can be associated with any of the host ports they are supposed to use on any of these nodes.

SUMMARY

Embodiments of the present disclosure provide for a method, system, and computer program product for managing access of virtual machines.

One embodiment is directed toward a method for managing access of virtual machines executed by a host computer system to storage area networks. The method includes connecting, using the storage area networks, the host computer system with a storage system via switches, where the host computer system includes one or more host ports to connect with a switch each, and where one or more port names are assigned to each virtual machine. The method also includes sending the port names of a virtual machine and a target port name as part of a validate access command to the respective switch for each storage area network connected with the host computer system. The method also includes returning, by the switch, success information to the sending host computer system when receiving the validate access command by the switch, in case all received virtual machine port names have access to a target port assigned to the received target port name, otherwise returning a fail information. The method also includes sending host port names of the host computer system and logical unit names provided by the target port as part of the validate access command to the respective target port, for each storage area network connected with the host computer system and for each target port accessible by the storage area network. The method also includes returning, by the storage system, success information to the sending host computer system when receiving the validate access command by the target port, in case all received host port names have access to logical units assigned to the received logical unit name, otherwise returning a fail information.

Other embodiments are directed toward a system and computer program product for managing access of virtual machines The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
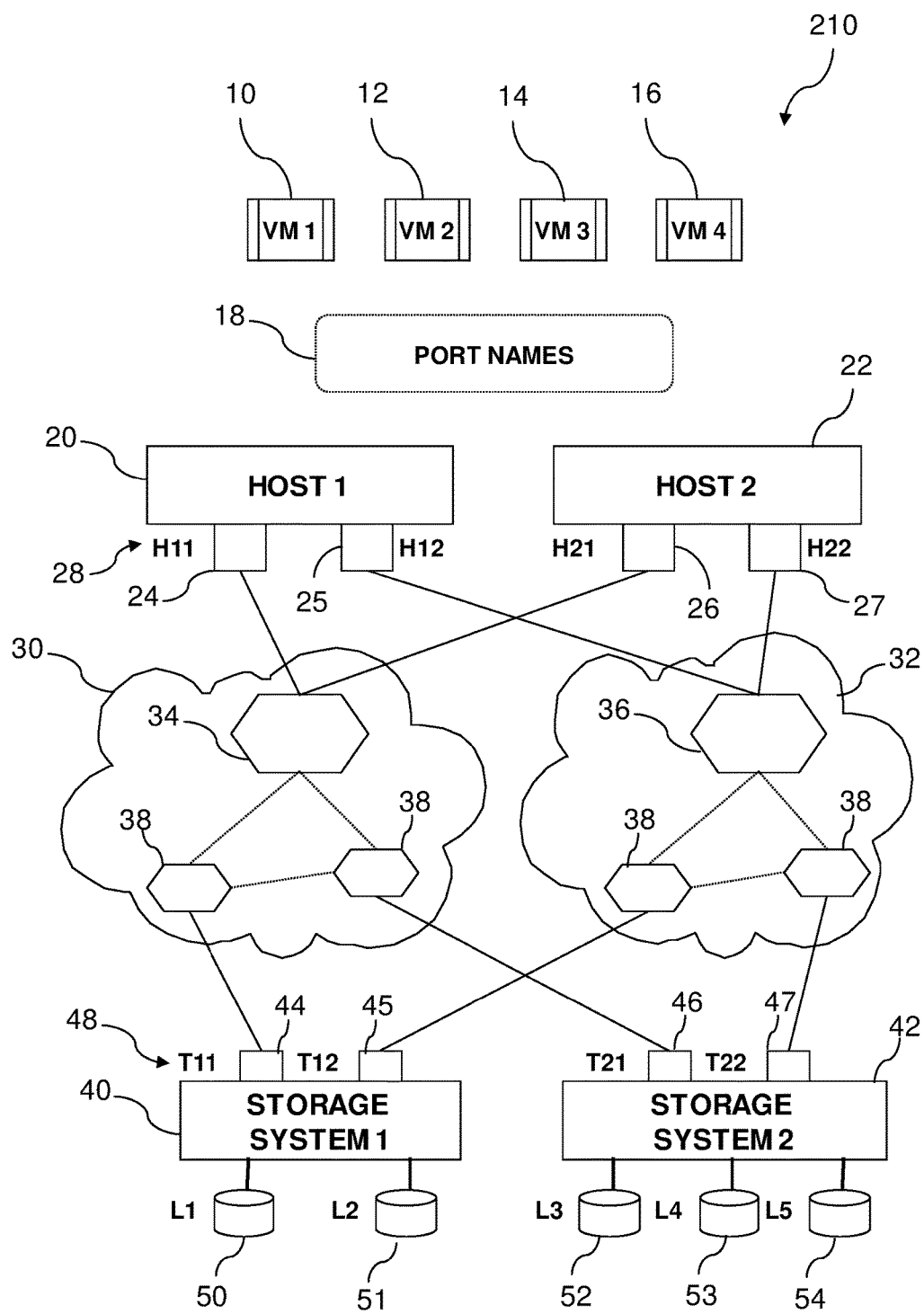
FIG. 1 depicts a configuration of a data processing system with storage area networks (SANs) connecting host computer systems with storage systems, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing systems, and in particular, to a method, system and computer program product for managing access of virtual machines executed by a host computer system to storage area networks. While the present disclosure is not necessarily limited to such applications, various aspects of the disclosure may be appreciated through a discussion of various examples using this context.

The illustrative embodiments described herein provide a method, system, and computer program product for managing access of virtual machines to storage area networks and storage systems. The illustrative embodiments are sometimes described herein using particular technologies only as an example for the clarity of the description. The illustrative embodiments may be used for managing access of virtual machines executed by a host computer system to storage area networks, the storage area networks connecting the host computer system with storage systems via switches.

FIG. 1 depicts a configuration of a data processing system 210 with storage area networks (SANs) connecting host computer systems with storage systems, according to various embodiments.

The data processing system 210 exhibits a number of virtual machines 10, 12, 14, 16 running on two host computer systems 20, 22. These host computer systems 20, 22 are connected via host ports 24, 25, 26, 27 with entry switches 34, 36 of two SANs 30, 32. Internally in the SANs 30, 32, the entry switches 34, 36 are routed via additional switches 38 for being connected with target ports 44, 45, 46, 47 of two storage systems 40, 42. The storage systems 40, 42 are equipped with logical units (LUNs) 50, 51, 52, 53, 54. The virtual machines 10, 12, 14, 16 use a pool of port names 18 for communicating with the SANs 30, 32 as well as with the storage systems 40, 42.

The storage area networks 30, 32 may include fiber channel systems, whereas the virtual machine port names 18 may be implemented as world-wide unique port names.

According to the embodiment of FIG. 1, a method for managing access of the virtual machines 10, 12, 14, 16 executed by the host computer systems 20, 22 to the storage area networks 30, 32 is described, where the storage area networks 30, 32 are connecting the host computer systems 20, 22 with the storage systems 40, 42 via switches 34, 36, 38, where the host computer systems 20, 22 includes one or more host ports 24, 25, 26, 27 to connect with a switch 34, 36 each. The one or more port names 18 are hereby assigned to each virtual machine 10, 12, 14, 16. The disclosed method thus includes (i) for each storage area network 30, 32 connected with the host computer system 20, 22 sending the port names 18 of a virtual machine 10, 12, 14, 16 and a target port name 48 as part of a validate access command to the respective switch 34, 36; and (ii) when receiving the validate access command by the switches 34, 36, the switches 34, 36 are returning success information to the sending host computer system 20, 22 in case all received virtual machine port names 18 have access to a target port 44, 45, 46, 47 assigned to the received target port name 48. Otherwise the switches 34, 36 are returning a fail information. Secondly, the method includes, according to various embodiments, additionally or alternatively (iii) for each storage area network 30, 32 connected with the host computer systems 20, 22 and for each target port 44, 45, 46, 47 accessible by the storage area networks 30, 32 sending host port names 28 of the host computer system 20, 22 and logical unit names 55 provided by the target port 44, 45, 46, 47 as part of the validate access command to the respective target port 44, 45, 46, 47; and (iv) when receiving the validate access command by the target port 44, 45, 46, 47, the storage system 40, 42 returning success information to the sending host computer system 20, 22 in case all received host port names 28 have access to logical units 50, 51, 52, 53, 54 assigned to the received logical unit name 55. Otherwise a fail information is returned, according to various embodiments.

The validate access command includes a set of target port names 48. Due to the disclosed method the network access by one of the host ports 24, 25, 26, 27 is established using a login in the respective switch 34, 36 with a host port name 28 to which the switch 34, 36 responds with identification data for the respective storage area network 30, 32, according to various embodiments. A fabric login may be performed via each host port 24, 25, 26, 27, the fabric login returning information about the storage area network 30, 32 being attached, the host port 24, 25, 26, 27 currently not being logged in the storage area network 30, 32.

A zone may be defined comprising the virtual machines port names 18 and the target ports 44, 45, 46, 47 accessible for the virtual machine port names 18. Further a group of logical units 50, 51, 52, 53, 54 of each storage system 40, 42 may be defined accessible via target ports 44, 45, 46, 47 of the storage system 40, 42 for the virtual machine port names 18.

Figure 2:
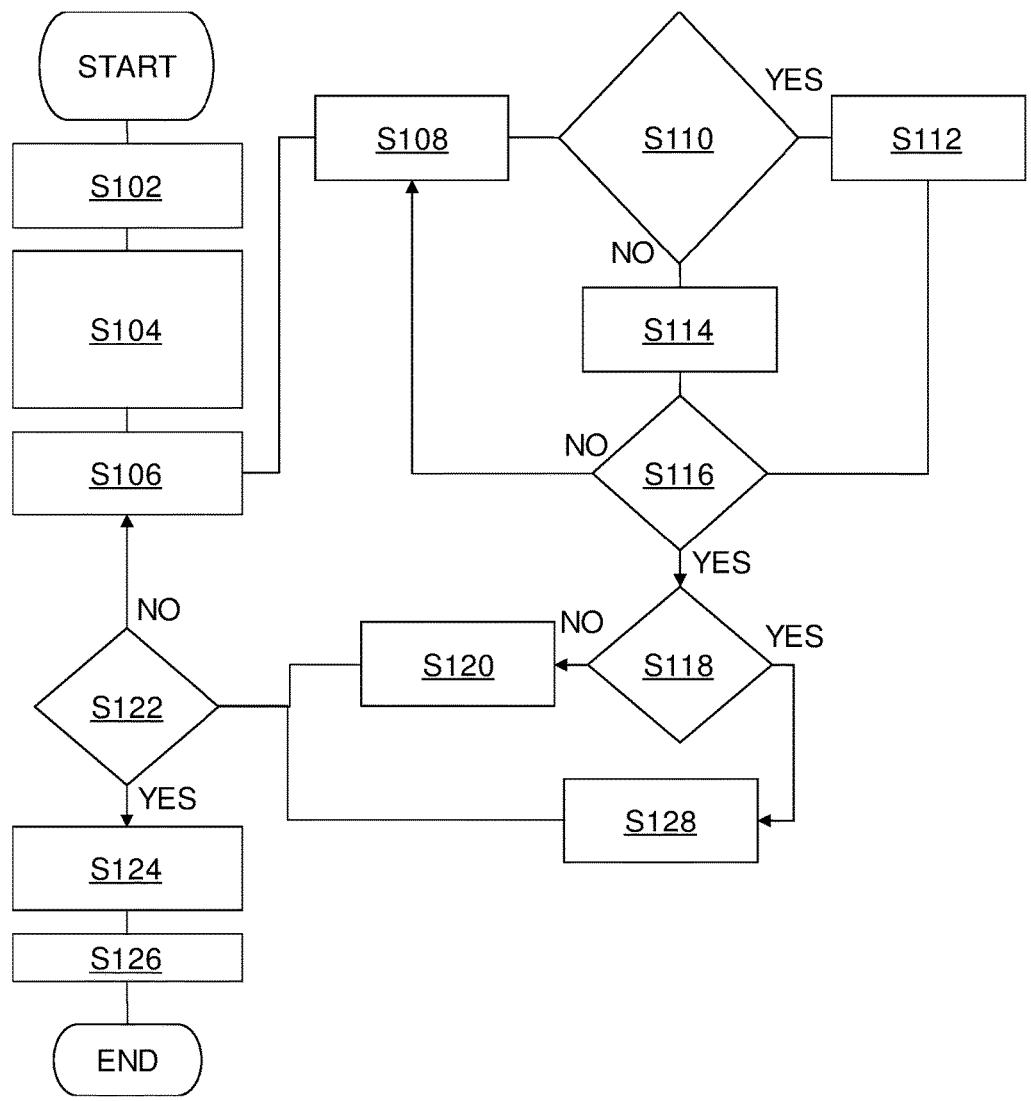
FIG. 2 depicts a flowchart for validating access of virtual machines port names to target ports of the storage systems, according to various embodiments.

FIG. 2 depicts a flowchart for validating access of virtual machines port names to target ports of the storage systems, according to various embodiments.

Figure 3:
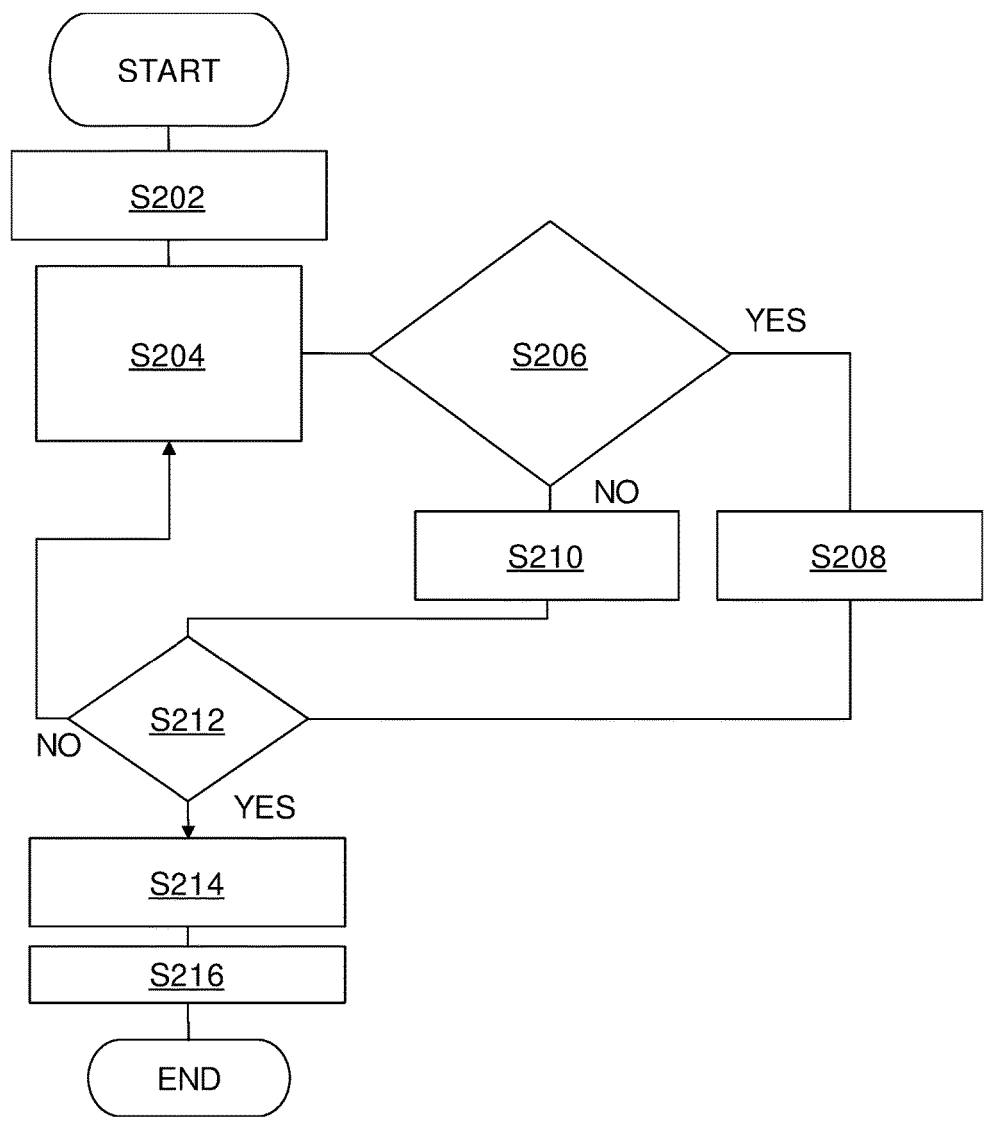
FIG. 3 depicts a flowchart for validating access of host ports to logic units of the storage systems, according to various embodiments.

In FIGS. 2 and 3, reference numerals shown in FIG. 1 are also used. According to the disclosed method the program flow starts with parameters of the virtual machine port names 18 and the target port names 48. In step S102 a list of zones for each port name 18 is created, according to various embodiments. Next in step S104 a response list with a row for each port name 18 and column for each target port 44, 45, 46, 47 is created. Further in addition a summary list is established. In step S106 for each target port name 48 the next target port name 48 is fetched. For each port name 18 the next port name 18 is fetched in step S108. In step S110 it is checked if the same zone is part of the target port zone list and the port zone list. If 'yes' in step S112 an 'ok' is entered in the response list entry for the target port 44, 45, 46, 47 and the port name 18, otherwise, a 'no' is entered into the response list. Then the flow continues with step S116 checking if this is the last port name 18. If this was not the last port name 18 the loop is reentered with step S108, otherwise a next check is performed in step S118 if the target port name 48 is in a zone with each port name 18. If 'yes' the summary is updated in step S128 with 'yes', otherwise with 'no' in step S120. The flow continues with check S122 if this was the last target port name 48. If 'yes' the result is converted in step S124 into an appropriate format according e.g. the extended link service (ELS) and the response list sent back in step S126, otherwise the loop is reentered in step S106, according to various embodiments.

FIG. 3 depicts a flowchart for validating access of host ports to logic units of the storage systems, according to various embodiments.

The program flow according to the disclosed method starts with the parameters virtual machine port names 18 and the names of the logical units 50, 51, 52, 53, 54. In step S202 for each logical unit 50, 51, 52, 53, 54 the name of the next logical unit is fetched and in step S204 for each port name 18 the next port name 18 is fetched. In step S206 it is checked if the port name 18 has access to the logical unit 50, 51, 52, 53, 54 through a target port 44, 45, 46, 47. If 'yes' an 'ok' is entered in the response list entry for the port name 18 in step S208, otherwise a 'no' is entered in step S210. Then the flow is continued with the check in step S212 if this was the last port name. If 'yes' the result is converted in step S214 into an appropriate format according e.g. the extended link service (ELS) and the response list sent back in step S216, otherwise the loop is reentered in step S204 for the next port name 18, according to various embodiments.

Figure 4:
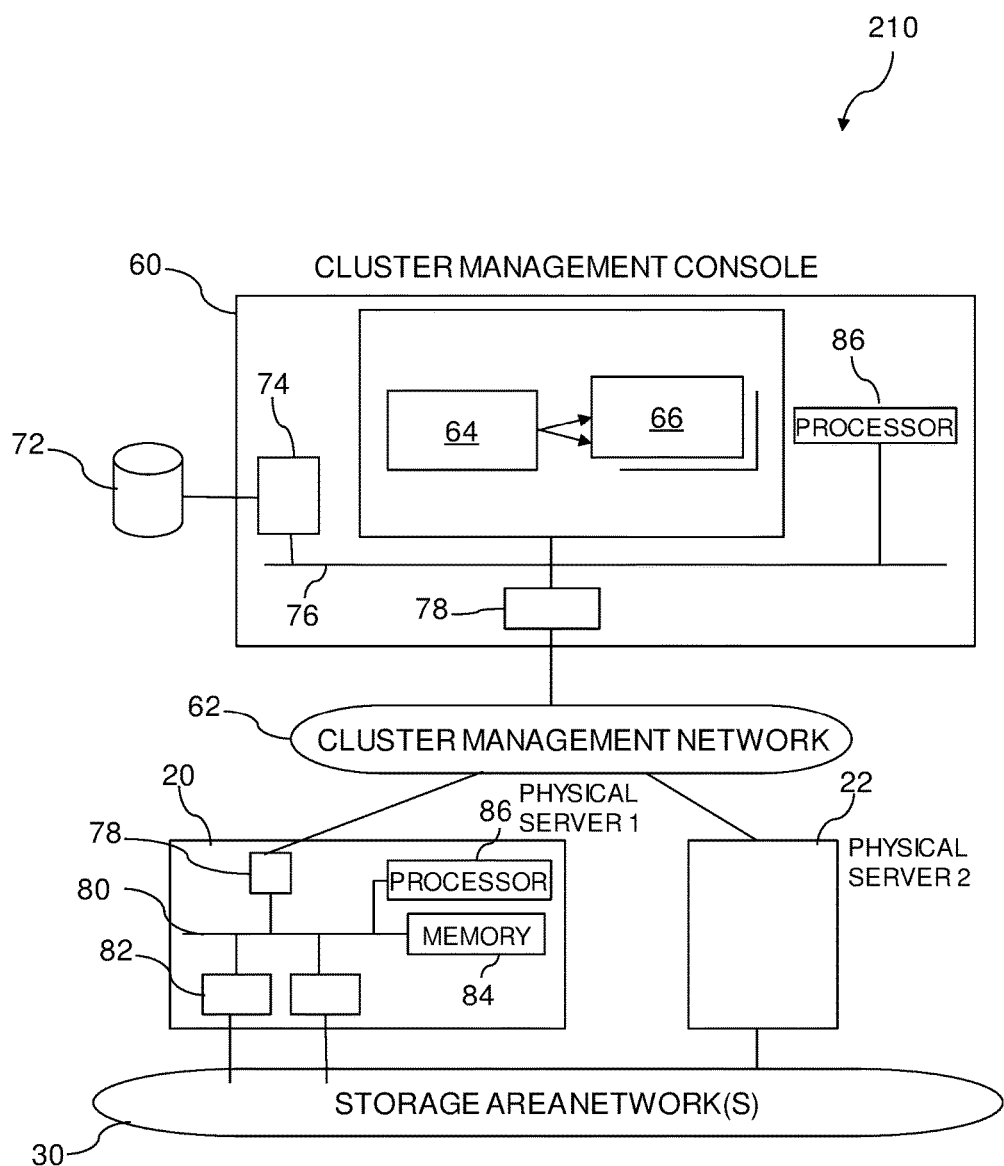
FIG. 4 depicts a component diagram of the data processing system for managing access of virtual machines executed by host computer systems to a storage area network, according to various embodiments.

FIG. 4 depicts a component diagram of the data processing system 210 for managing access of virtual machines executed by host computer systems to a storage area network, according to various embodiments. In FIG. 4 reference numerals already shown in FIG. 1 are also used.

Access consistency validation according to the disclosed method is performed by a validate access command via an access validation program 64, that runs on a cluster management console 60 of a data processing system 210. The access validation requirements and results are recorded in access consistency groups 66, also maintained and persisted on the cluster management console 60, according to various embodiments. The access validation program 64 accesses the nodes of the cluster via a cluster management network 62.

One possible goal is to validate the consistency of the access group 66. This access consistency groups 66 consist of (a) virtual machine port names 18 (b) target port names 48 and logical units 50, 51, 52, 53, 54 (c) host ports 24, 25, 26, 27. Consistency is achieved, when each port name 18 can reach all logical units 50, 51, 52, 53, 54 through all of the host ports 24, 25, 26, 27. The access validation program 64 determines the SAN 30 for each host port 24, 25, 26, 27. Further, it initiates that the validate access consistency command is sent to each SAN 30, and to each applicable storage subsystem target port 44, 45, 46, 47, according to various embodiments. The structure of the access consistency group 66 and the steps of the validation are described in more detail on the following charts in the FIGS. 5 and 6.

Figure 5:
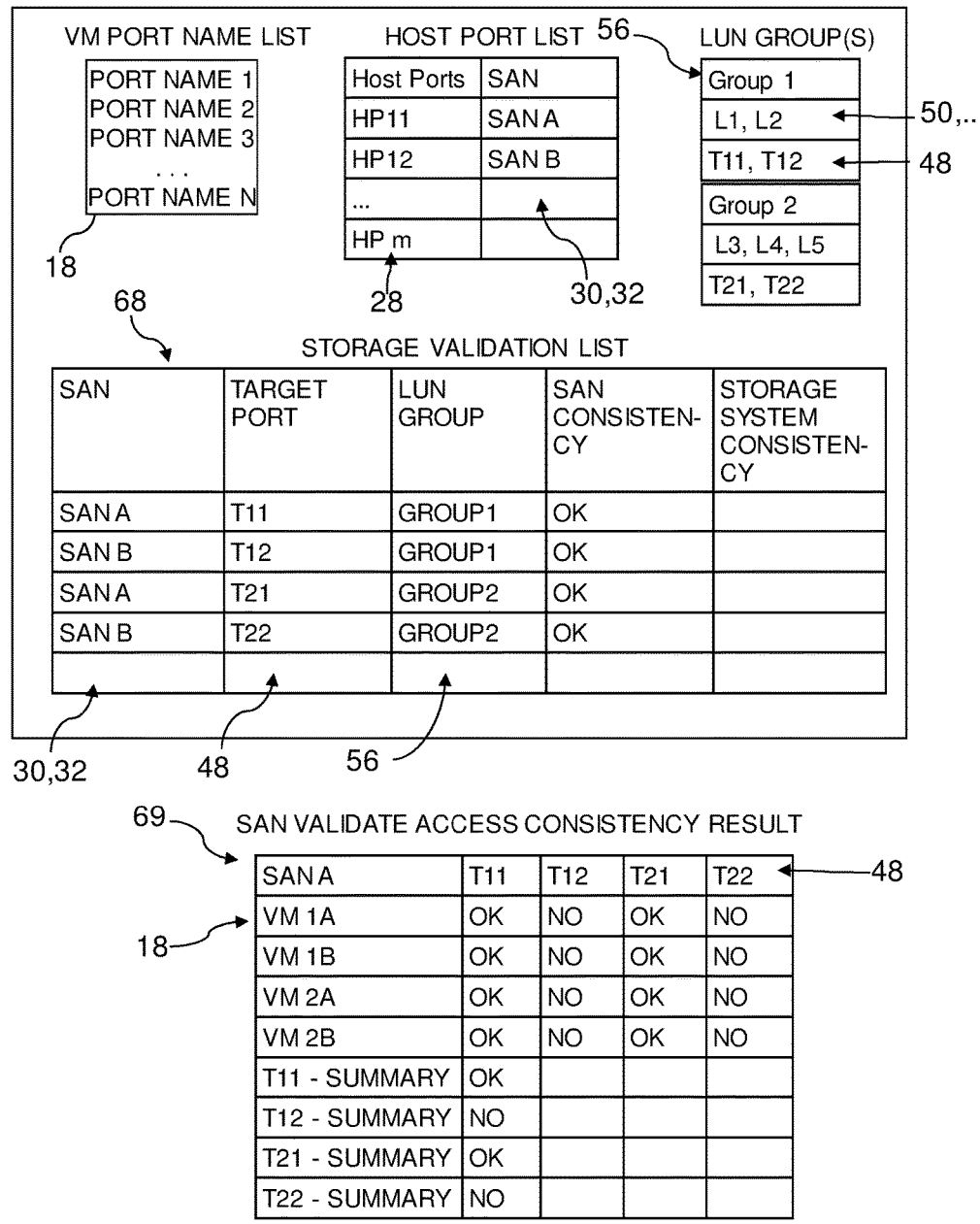
FIG. 5 depicts an implementation chart according to the disclosed method for SAN access validation, according to various embodiments.

FIG. 5 depicts an implementation chart according to the disclosed method for SAN access validation, according to various embodiments.

A storage validation list 68 is defined comprising information from the validate access command. The storage validation list 68 includes an entry for each combination of a storage area network 30, 32, listed in the access consistency group 66, and the group of logical units 56 for a valid access of a virtual machine port name 18 to the storage system 40, 42.

The implementation of the disclosed method is started with an access consistency group 66 being created for one or more virtual machines 10, 12, 14, 16, consisting of a set of virtual machines port names 18, the host ports 24, 25, 26, 27 to be used and one or multiple LUN Groups, each referencing one or multiple LUN numbers, and the target port names 48 which can be used to access the LUNs 50, 51, 52, 53, 54.

Variations of a consistency group 66 are possible. For example, without any target port 44/LUN 50 information, at the beginning of this process performing discovery for one host port name per SAN 30, filling the SAN 30/Target Port 44/LUN Group information based upon the gathered information.

The port names 18 are recorded in a virtual machine port name list, according to various embodiments. A host port list is initialized with the set of host ports 24, 25, 26, 27 that are part of this consistency group. A storage validation list 68 is initialized.

The SAN 30, 32 attached to each host port 24, 25, 26, 27 is determined. A fabric login is performed via each host port 24, 25, 26, 27, using one of the port names 18, according to various embodiments. The fabric login returns the information which SAN 30, 32 is attached. If the SAN 30, 32 is known already, no fabric login needs to be done. Fabric login is generally done with a port name 18, which is not currently logged in, according to various embodiments.

The validate access command is sent to each SAN 30, 32. Parameters are the target port names 48 from the LUN groups and the virtual machine port names 18.

The storage validation list 68 is filled with the information returned by the validate access command. If the summary for a target port says 'ok', all virtual machines port names 18 have access to the target port 44, 45, 46, 47. An entry is added to the storage validation list 68 to the SAN 30, 32, concerning the SAN 30, 32, the target port 44, 45, 46, 47, and the LUN group 56 from the LUN groups list.

Finally, an entry exists in the storage validation list 68 for each SAN 30, 32, listed in the host port list and LUN group combination. If this is not the case, some of the SANs 30, 32 don't allow access to some of the LUNs 50, 51, 52, 53, 54 and the access consistency group 66 is inconsistent. Optionally the SAN/LUN group combination which was not successful in the SAN consistency column could be filled. The access consistency group 66 may be considered to be consistent if there is an entry for each combination of a SAN 30, 32 and a LUN group 56.

Alternatively, because a target port 44, 45, 46, 47 could be assigned to several LUN groups 56, an entry could be made for each SAN/target port/LUN group combination with results of validate access commands. Then it would be checked if each SAN 30, 32 has access to each LUN group 56.

Figure 6:
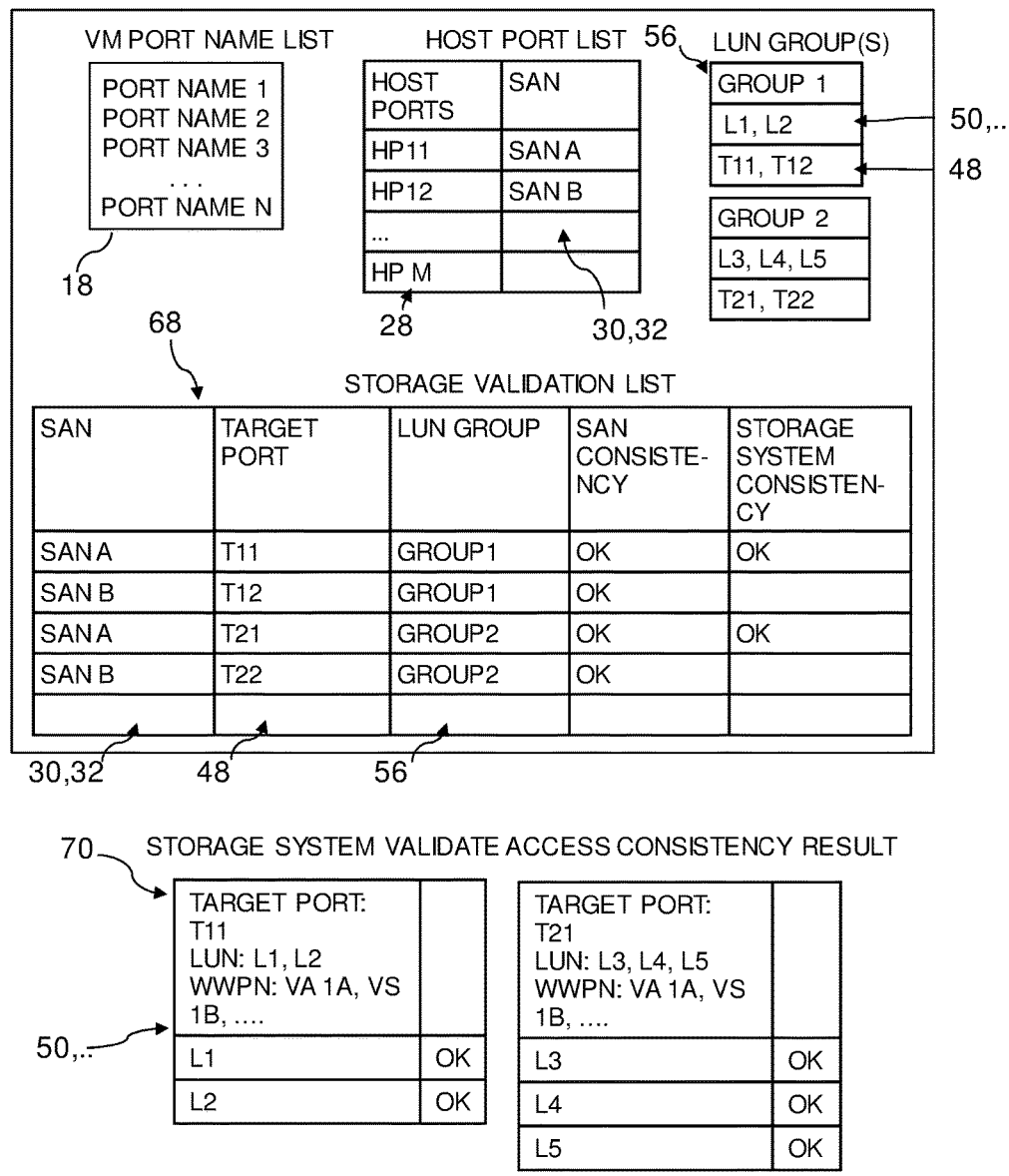
FIG. 6 depicts an implementation chart according to the disclosed method for target port access validation, according to various embodiments.

FIG. 6 depicts an implementation chart according to the disclosed method for target port access validation, according to various embodiments.

A final SAN validate access consistency result table 69 is created. The validate access command is sent to each target port 44, 45, 46, 47 in the storage validation list 68, according to various embodiments. Multiple entries may exist, if the target port 44, 45, 46, 47 is referenced by multiple LUN groups.

Parameters are the virtual machines port names 18 from the virtual machine port name list and the LUNs 50, 51, 52, 53, 54 from the LUN group. The storage validation list is filled with the information returned by the validate access command. If all virtual machine port names 18 have access to the LUNs 50, 51, 52, 53, 54 provided as parameters through the validate access command, an 'ok' is marked in the storage subsystem consistency field for the target port 44/LUN group combination. It should be noted that it is sufficient to check the LUN summary of the response. Otherwise, a 'no' is marked in the storage subsystem consistency field for the target port 44/LUN group combination, according to various embodiments.

The access consistency group is consistent, if at least one entry exists in the storage validation list for each SAN/LUN group combination with 'ok' in the SAN consistency field and 'ok' in the storage subsystem consistency field.

Figure 7:
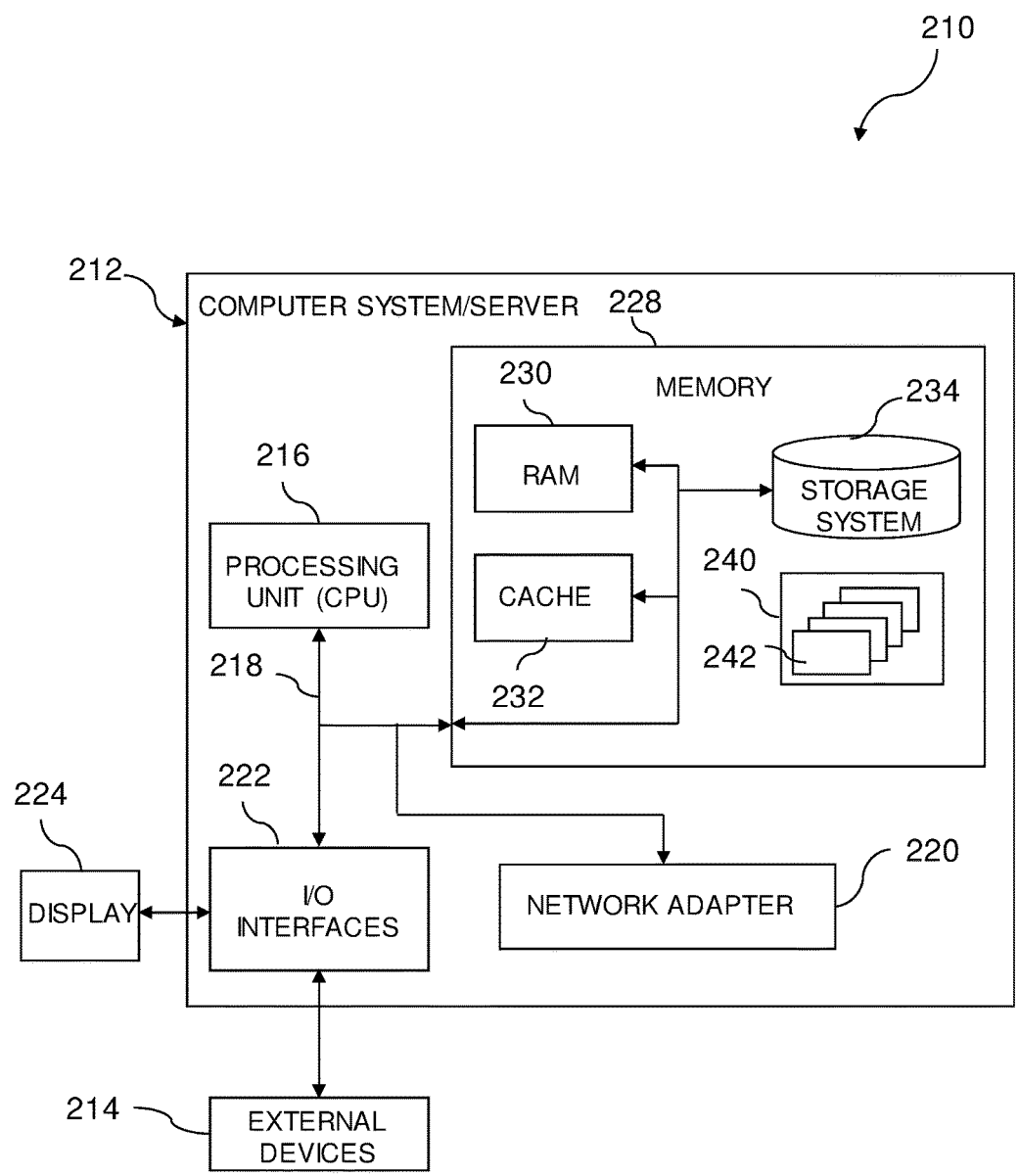
FIG. 7 depicts an example embodiment of a data processing system for executing a method, according to various embodiments.

FIG. 7 depicts an example embodiment of a data processing system 210 for executing a method, according to various embodiments.

Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing access of virtual machines executed by a host computer system to storage area networks, comprising:
   defining a storage validation list, wherein the storage validation list indicates at least that, for a first storage area network connecting the host computer system to a storage system, respective virtual machines of a plurality of virtual machines executing on the host computer system have access to a first group of logical units via a first target port of the storage system, and further indicates at least that, for a second storage area network connecting the host computer system to the storage system, respective virtual machines of the plurality of virtual machines executing on the host computer system have access to a second group of logical units via a second target port of the storage system;
   returning, by a respective switch of a respective storage area network connecting the host computer system with the storage system, success information to the host computer system in response to respective virtual machine port names having access to a target port associated with a target port name specified in a validate access command; and
   returning, by the storage system, success information to the host computer system in response to respective host ports of the host computer system having access to at least one logical unit associated with a logical unit name specified in the validate access command.

2. The method according to claim 1, wherein a network access is established, by one of the host ports, using a login in the respective switch with a host port name to which the respective switch responds with identification data for the respective storage area network.

3. The method according to claim 2, wherein performing a fabric login via each host port includes the fabric login returning information about the storage area network being attached, the host port currently not being logged in the storage area network.

4. The method according to claim 1, wherein the validate access command includes a set of target port names.

5. The method according to claim 1, wherein the storage validation list contains an entry for respective combinations of storage area network, target port, and logical unit group satisfying a storage area network consistency and a storage system consistency;
   wherein a respective combination satisfies the storage area network consistency if each virtual machine port name has access to a given target port via a given storage area network; and
   wherein a respective combination satisfies the storage system consistency if, for a logical unit group, each virtual machine port name has access to each logical unit in the logical unit group.

6. The method according to claim 1, wherein the storage validation list is converted to an extended link service (ELS) format.

7. The method according to claim 1, further comprising defining a zone including the virtual machine port names and respective target ports accessible for the virtual machine port names.

8. The method according to claim 1, wherein the logical units of the storage system are accessible via target ports of the storage system for the virtual machine port names.

9. The method according to claim 1, wherein the validate access command is performed via an access validation program executing on a cluster management console of a data processing system.

10. The method according to claim 9, wherein accessing nodes of a cluster by the access validation program is performed via a cluster management network.

11. The method according to claim 9, wherein the access validation program is configured to determine the storage area networks for respective host ports.

12. The method according to claim 1, further comprising defining an access consistency group including a set of virtual machine port names and host ports of the host computer system to be used, and a group of logical units referencing respective target ports and logical units accessible via the respective target ports.

13. The method according to claim 12, wherein maintaining the access consistency group is performed on a cluster management console.

14. The method according to claim 1, wherein the storage validation list includes an entry for each combination of a storage area network, listed in an access consistency group, and a group of logical units for a valid access of a virtual machine port name to the storage system.

15. A computer program product for managing access of virtual machines executed by a host computer system to storage area networks, wherein the computer program product comprises a computer readable storage medium having program instructions embodied therewith, the program instructions executable by a computer to cause the computer to perform a method, comprising:
   defining a storage validation list, wherein the storage validation list indicates at least that, for a first storage area network connecting the host computer system to a storage system, respective virtual machines of a plurality of virtual machines executing on the host computer system have access to a first group of logical units via a first target port of the storage system, and further indicates at least that, for a second storage area network connecting the host computer system to the storage system, respective virtual machines of the plurality of virtual machines executing on the host computer system have access to a second group of logical units via a second target port of the storage system;
   returning, by a respective switch of a respective storage area network connecting the host computer system with the storage system, success information to the host computer system in response to respective virtual machine port names having access to a target port associated with a target port name specified in a validate access command; and
   returning, by the storage system, success information to the host computer system in response to respective host ports of the host computer system having access to at least one logical unit associated with a logical unit name specified in the validate access command.

16. The computer program product of claim 15, wherein the storage validation list contains an entry for respective combinations of storage area network, target port, and logical unit group satisfying a storage area network consistency and a storage system consistency.

17. The computer program product of claim 16, wherein a respective combination satisfies the storage area network consistency if each virtual machine port name has access to a given target port via a given storage area network.

18. The computer program product of claim 16, wherein a respective combination satisfies the storage system consistency if, for a logical unit group, each virtual machine port name has access to each logical unit in the logical unit group.

19. A system for managing access of virtual machines executed by a host computer system to storage area networks, the system comprising:
   a processor; and
   a computer readable storage medium for storing program instructions which, when executed by the processor, perform a method comprising:
      defining a storage validation list, wherein the storage validation list indicates at least that, for a first storage area network connecting the host computer system to a storage system, respective virtual machines of a plurality of virtual machines executing on the host computer system have access to a first group of logical units via a first target port of the storage system, and further indicates at least that, for a second storage area network connecting the host computer system to the storage system, respective virtual machines of the plurality of virtual machines executing on the host computer system have access to a second group of logical units via a second target port of the storage system;
      returning, by a respective switch of a respective storage area network connecting the host computer system with the storage system, success information to the host computer system in response to respective virtual machine port names having access to a target port associated with a target port name specified in a validate access command; and
      returning, by the storage system, success information to the host computer system in response to respective host ports of the host computer system having access to at least one logical unit associated with a logical unit name specified in the validate access command.

20. The system of claim 19, wherein the storage validation list contains an entry for respective combinations of storage area network, target port, and logical unit group satisfying a storage area network consistency and a storage system consistency;
   wherein a respective combination satisfies the storage area network consistency if each virtual machine port name has access to a given target port via a given storage area network;
   wherein a respective combination satisfies the storage system consistency if, for a logical unit group, each virtual machine port name has access to each logical unit in the logical unit group; and
   wherein the storage validation list is converted to an extended link service (ELS) format.

* * * * *